Jan. 29, 1957  B. G. HARRIS  2,779,469
APPARATUS FOR RECOVERING AND CLEANING THE
RESIDUAL SAND CONTENT FROM THE TAILINGS
OF GRAVEL WASHING PLANTS
Filed April 9, 1954  2 Sheets-Sheet 1

INVENTOR.
Bruce G. Harris
BY
Shepherd & Campbell
Attys

Jan. 29, 1957
B. G. HARRIS
2,779,469
APPARATUS FOR RECOVERING AND CLEANING THE
RESIDUAL SAND CONTENT FROM THE TAILINGS
OF GRAVEL WASHING PLANTS
Filed April 9, 1954
2 Sheets-Sheet 2
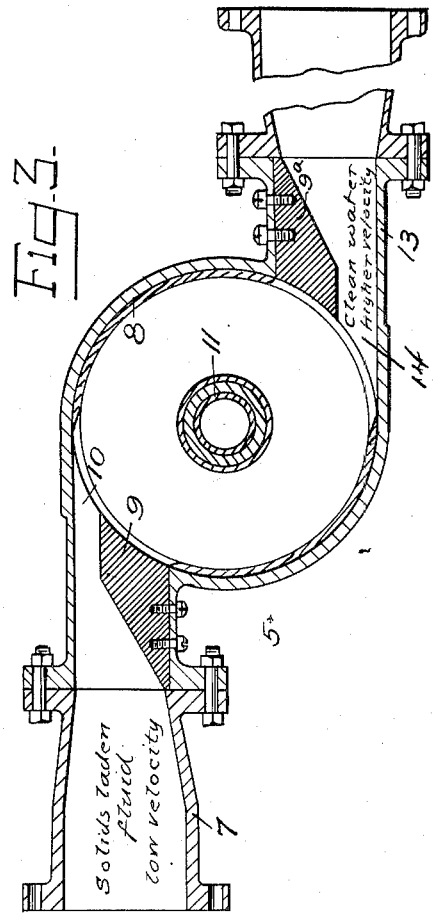
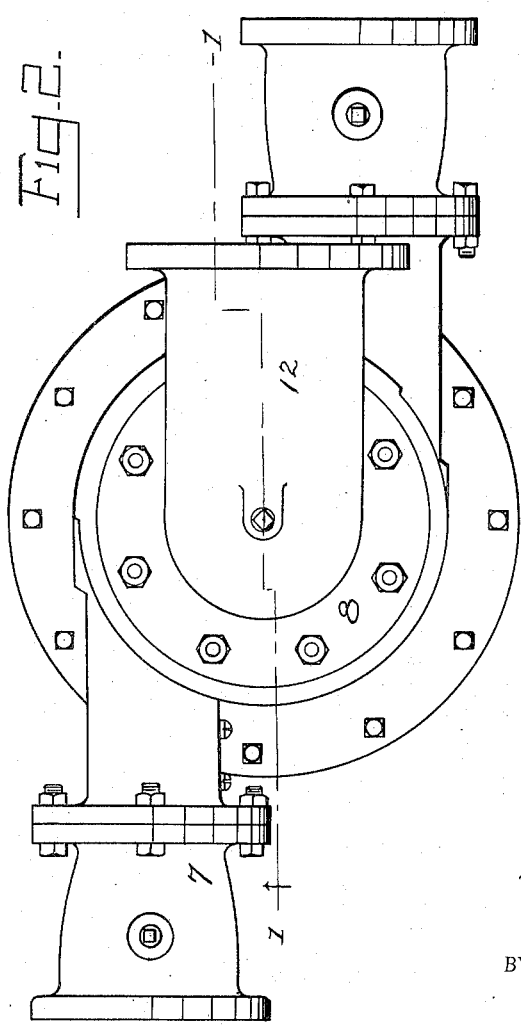
INVENTOR
*Bruce G. Harris*
BY *Shepherd Campbell*
ATTORNEYS

United States Patent Office 2,779,469
Patented Jan. 29, 1957

2,779,469

APPARATUS FOR RECOVERING AND CLEANING THE RESIDUAL SAND CONTENT FROM THE TAILINGS OF GRAVEL WASHING PLANTS

Bruce G. Harris, Arlington, Va.

Application April 9, 1954, Serial No. 422,135

5 Claims. (Cl. 209—211)

This invention relates to a method of and means for recovering otherwise waste sand from the tailings of gravel washing plants. Bank gravel as it comes from the banks or pits consists of a dirty mixture of sand, clay and gravel. In the production of a clean gravel this material is passed through various washers, crushers and screens. In the washing process the gravel and the coarser sand is separated from the clay and any ordinary dirt which may be in the material. In the washing large quantities of water are employed and after the gravel and coarser sands have been removed the water carries to a sump the tailings consisting of clay mud and a considerable quantity of sand which is too fine to be trapped on ordinary screens which carry off the coarser sands.

It is the primary object of the invention to retrieve this fine sand which, otherwise would be discarded along with the mud and in the process of retrieving it to thoroughly wash and clean it.

The invention will be best understood by reference to the accompanying drawings wherein:

Fig. 2 is a plan view of the structure shown in Fig. 1; and

Fig. 3 is a sectional view on line 3—3 of Fig. 1.

Like numerals designate corresponding parts in all of the figures of the drawings.

Figure 1:
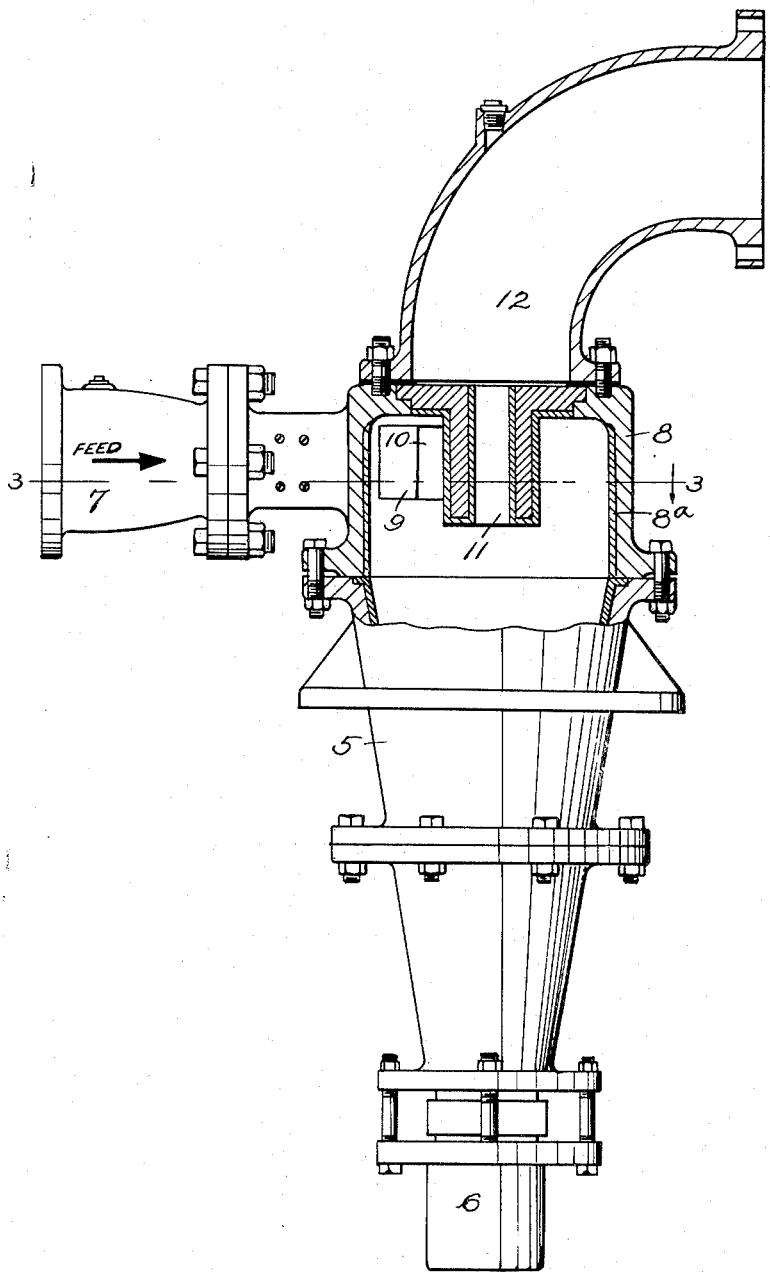
Fig. 1 is a view partly in section upon line 1—1 of Fig. 2 and partly in elevation, of an apparatus embodying the invention.

It has heretofore been proposed and machines are already in use for reclaiming the fine sand from the tailings of gravel washing plants, in which a mixture of the sand carrying mud is pumped from the bottom of the tailings sump and delivered tangentially into a stationary cylindrical cone. The whirling motion imparted to the mud laden water centrifugally separates the sand carrying portion of the mixture from the clay carrying portion thereof and the latter portion is discharged through a vortex finding outlet to a final waste pipe. The fine sand carrying portion is discharged from the small end of the cone to a point of recovery of said fine sand.

A well known type of machine embodying the elements so far described comprises a stationary cone 5 the discharge end of which is indicated at 6. A feed pipe 7 delivers the mud mixture of clay, sand and water tangentially into a head 8. A removable feed shim 9 which may be changed as and if desired serves to vary the size of the orifice 10 through which the fluid is discharged into head 8. Because of the tangential direction of the incoming fluid a whirling motion is imparted to the fluid mass, the sand is thrown against the wall of the cone and travels toward and is discharged with part of the water, from the discharge end 6 of the cone. The clay and any other impurities constitute, with its carrying fluid, a core which escapes through an axially disposed vortex finding tube 11 into a final waste pipe 12.

My invention resides in providing a second inlet pipe 13 which discharges tangentially at 14 into the head, preferably though not necessarily, at the side thereof opposite to the side at which feed pipe 7 discharges into the head. Clean water is discharged through this second inlet pipe in a direction to step up the centrifugal action of the mass. This additional supply of clean water is introduced at a pressure and velocity materially higher than the pressure and velocity of the incoming mud through inlet pipe 7. A feed shim 9a may be employed to aid in controlling the velocity of the entering clean water as in the case of shim 9. I may provide a renewable lining 8a for head 8, if desired. The abrading action of the whirling sand is severe and removable lining provides means for renewing the same from time to time. Since the sand which comes in through pipe 7 has been for some time in contact with the clay mud it follows that even after the sand has been centrifugally separated from the mud and thrown outwardly toward the side of the cone it is still quite dirty since some of the clay will cling to the sand. However, when an additional supply of clean water is shot into head 8 at a velocity greater than that at which the mud is entering said head the following advantageous results follow:

First, the velocity of the whole mass is speeded up and the centrifuging action is increased.

Second, the additional volume of clean water will take up more dirt from the sand than can the dirty water already laden with clay.

Third, the additional velocity of the water exerts a distinct scrubbing action on the sand as it tends to rush past the sand particles in bringing them up to a velocity determined by the degree of increased pressure and velocity of the incoming clean water.

Fourth, the introduction of the additional supply of clean water into an area into which the feed pipe 7 has already discharged, renders it possible to deliver from the feed pipe a much greater concentrate of solids in the delivered stream. This means that the delivered stream may be at lower pressure and velocity for the delivery of a given amount of solids. Since the pumping of the abrasive sand and clay mixture at a higher velocity would involve additional work on the pumps and additional abrasive action on all contacted parts, distinct savings are effected by this additional supply of clean water into the centrifuging head, such additional water being in considerable volume. The low velocity, mud laden stream from pipe 7 and the high velocity, high pressure, clean water stream from pipe 13 are both discharged at substantially the same level or in the same transverse plane, into what is in substance an annular space. This space is that space which has the vortex finding tube as its inner wall and the inner surface of linging 8a as its outer wall. The resultant momentary confining of the two streams in this space makes the higher velocity stream more effective in its scrubbing action upon the sand in the mud and sand laden stream. Since the action in head 8 is under pressure the device may be used in any desired position. I find that good results are had when the cone is so disposed that its axis lies horizontally.

Since other forms of apparatus might be employed in carrying out the invention and since I believe that I am the first to introduce an additional stream of water at increased velocity into a swirling mass of sand laden mud in a centrifuge, with the advantageous results described, it is to be understood that the invention is not limited to the specific apparatus disclosed but that it includes within its purview whatever changes fairly fall within either the terms of the spirit of the appended claims.

I claim:

1. A machine comprising in combination a circular centrifuge chamber, a solids feed pipe for mud consisting of clay and sand, said pipe discharging tangentially into said chamber and a clean water supply pipe also discharging tangentially into said chamber substantially in the lateral plane of the solids feed pipe and in a direction to step up the swirling action induced by the tangential entry of the clay and sand, the said clean water supply being at a pressure and velocity greater than the pressure and velocity existent in the solids feed pipe.

2. A machine comprising in combination a circular centrifuge chamber, a solids feed pipe for mud consisting of water, clay and sand, said pipe discharging tangentially into said chamber and a clean water supply pipe also discharging tangentially and at a point in said chamber substantially in the lateral plane of and substantially opposite to the point of entry of the material from the solids feed pipe into said chamber and in a direction to step up the swirling action induced by the tangential entry of the clay and sand.

3. A device of the character described comprising in combination a cylindrical head, a vortex finder element projecting axially into and partly through said head the outer wall of the vortex finder and the inner wall of the head defining an annular space between them, a low velocity solids delivering pipe discharging tangentially into said space and serving to discharge water laden with clay mud and sand into said space and a high velocity clean water pipe also discharging tangentially into said space.

4. A structure as recited in claim 3 wherein the point of discharge of the high velocity pipe is substantially diametrically opposed to the point of discharge of the low velocity pipe.

5. A structure as recited in claim 3 wherein the point of discharge of the high velocity pipe is substantially diametrically opposed to the point of discharge of the low velocity pipe, and the vortex finder projecting inwardly of the transverse plane of both of said points of discharge.

References Cited in the file of this patent

UNITED STATES PATENTS

| | | |
|---|---|---|
| 762,866 | Allen | June 21, 1904 |
| 2,610,737 | Eder | Sept. 16, 1952 |